United States Patent
Peng

(10) Patent No.: US 10,871,541 B2
(45) Date of Patent: Dec. 22, 2020

(54) POSITIONING SYSTEM AND METHOD WITH MULTIPATH MITIGATION

(71) Applicant: Semtech Corporation, Camarillo, CA (US)

(72) Inventor: Mengkang Peng, Berkshire (GB)

(73) Assignee: Semtech Corporation, Camarillo, CA (US)

( * ) Notice: Subject to any disclaimer, the term of this patent is extended or adjusted under 35 U.S.C. 154(b) by 214 days.

(21) Appl. No.: 15/902,720

(22) Filed: Feb. 22, 2018

(65) Prior Publication Data

US 2018/0284215 A1 Oct. 4, 2018

(30) Foreign Application Priority Data

Mar. 31, 2017 (EP) ..................................... 17164423

(51) Int. Cl.
  *G01S 1/24* (2006.01)
  *G01S 5/02* (2010.01)
  *G01S 5/06* (2006.01)

(52) U.S. Cl.
  CPC ...... *G01S 1/24* (2013.01); *G01S 5/02* (2013.01); *G01S 5/0268* (2013.01); *G01S 5/0215* (2013.01); *G01S 5/06* (2013.01)

(58) Field of Classification Search
  CPC . G01S 1/24; G01S 5/02; G01S 5/0215; G01S 5/0268; G01S 5/06
  See application file for complete search history.

(56) References Cited

U.S. PATENT DOCUMENTS

| | | | |
|---|---|---|---|
| 2002/0172223 A1* | 11/2002 | Stilp | G01S 5/02 370/480 |
| 2015/0281899 A1* | 10/2015 | Sendonaris | G01S 5/0273 455/456.1 |
| 2016/0033613 A1 | 2/2016 | Hahn et al. | |
| 2016/0366554 A1* | 12/2016 | Markhovsky | G01S 3/46 |
| 2017/0026798 A1* | 1/2017 | Prevatt | G01S 13/767 |
| 2018/0203094 A1* | 7/2018 | Gudim | G01S 5/04 |

FOREIGN PATENT DOCUMENTS

| | | |
|---|---|---|
| EP | 3173807 A1 | 5/2017 |
| EP | 3173809 A1 | 5/2017 |
| WO | WO-00/40992 A1 | 7/2000 |
| WO | WO-2015/118135 A1 | 8/2015 |

OTHER PUBLICATIONS

Partial European Search Report for EP 18157966, dated Aug. 17, 2018, 12 pages.
European Search Report for EP 18157966, dated Feb. 1, 2019, 11 pages.

* cited by examiner

*Primary Examiner* — Timothy X Pham
(74) *Attorney, Agent, or Firm* — Blank Rome LLP

(57) ABSTRACT

The present invention proposed a weighted Centroid Localisation (WCL) algorithm, which does the location estimation based on the known positions of the gateways and the measurements times of arrival (TOA) at the gateways. The algorithm computes the weight of the gateway based on their rank when the gateways are sorted by their TOA. Simulations have demonstrated the algorithm's robustness under different multipath/fading channel conditions and its good location performance.

16 Claims, 2 Drawing Sheets

POSITIONING SYSTEM AND METHOD WITH MULTIPATH MITIGATION

REFERENCE DATA

This application claims priority of European patent application EP17164423.0 of 31 Mar. 2017, the contents whereof are incorporated by reference in their entirety.

TECHNICAL FIELD

Embodiments of the present invention relate to the field of determining a position of a mobile electronic device.

BACKGROUND

In IOT (Internet of Thing) and many other location related applications. It is required that an infrastructure be able to estimate the position of one or several wireless objects or target nodes. Achieving accurate location estimation in a wireless environment at low cost is a considerable challenge. This invention proposes a wireless network capable of locating its nodes with good accuracy, and that is largely immune from propagation disturbances, as well as the corresponding method.

In a typical location estimation system, there are several reference nodes, or gateways, whose locations are known, and one or several target nodes or motes, whose locations are to be estimated. In order to estimate the location of the target node, some metrics characterising the positioning information of the target node against the reference nodes, such as the distance or angles, needs to be measured through either the radio transmission by the target node and received by the reference nodes, or the other way around. In this invention, we consider the case where the target node makes radio transmissions, which are received by the gateways (reference nodes) around it.

Radiolocation is used in a number of radio location systems and wireless network, including the above-mentioned GPS, LORAN, radar, radio direction finders, and wireless networks such as cellphone networks, Bluetooth, WiFi, and LoRa.

Radiolocation methods generally rely on some metric characterising the position of the mobile node with reference to the gateways, or reference nodes, whose positions are known. The metric information might include the distance, the bearing, or the signal strength. They can be loosely divided between range-based and range-free methods. In the former, the position is determined geometrically, for example by multilateration, based on the ranges, or distances, between the target node and the gateways, while the latter estimate the position from the metric information by some non-geometric algorithm, for example by fingerprinting or weighting.

Range-based method can provide excellent precision and cover large areas with a limited number of gateways, as proved by the remarkable performance of GPS and other satellite location systems, but they are better suited for free-space propagation, and their performance rapidly degrades with the onset of multipath, and whenever the communication channel is disturbed and deviates from the ideal model. In particular, range-based methods tend to lose precision when used indoors, especially when used in narrow bandwidth systems.

Range-free methods ordinarily use the received signal strength (RSSI) as metric and, although their ultimate precision may be lower, they are relatively immune to propagation anomalies, providing useful position information, even in conditions characterized by strong multipath, where range-based method would break down. They may need a finer gateway spacing than range-based ones. Despite the considerable interest raised by range-free location, the design of a simple and robust weighting algorithm with good accuracy remains a major challenge.

The following description describes examples of the invention in which the position of the mobile node is determined in a 2-dimensional plane. Albeit important, this application is not limiting and the invention includes as well as variants in which the mobile nodes are localised in a 3-dimensional space.

BRIEF SUMMARY OF THE INVENTION

The present invention proposed a weighted Centroid Localisation (WCL) algorithm, which does the location estimation based only on the known positions of the gateways and the measurements of the time of arrival (TOA) at the gateways.

DETAILED DESCRIPTION OF EMBODIMENTS OF THE INVENTION

Figure 1:
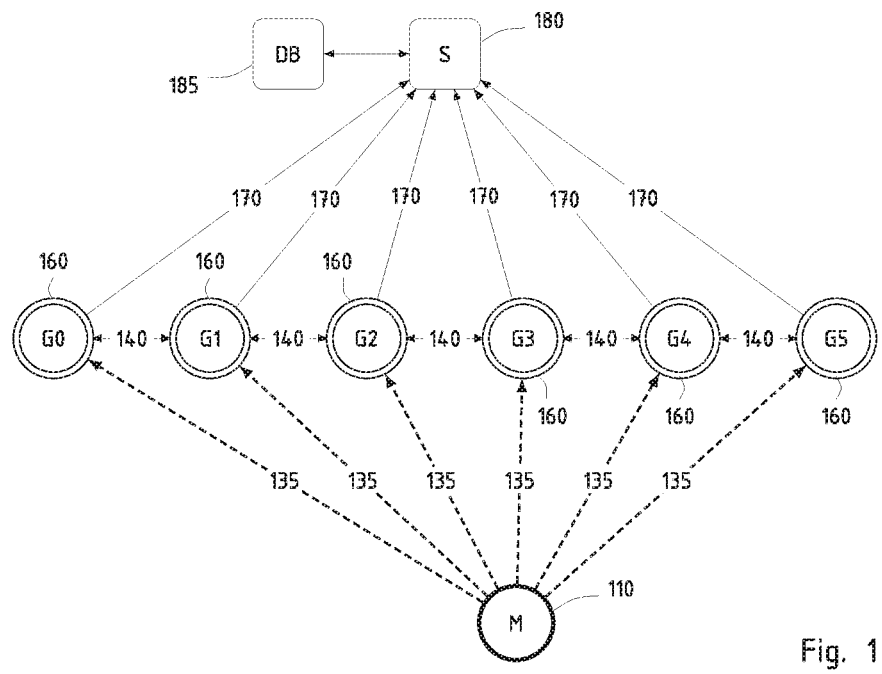
FIG. 1 illustrates in schematic simplified manner, a process of localization by which a plurality of gateways receive a localization packet transmitted by a mobile node and determine its location by means of a solver that processes the times of arrival of the packets at each gateway. The invention also proposed enhanced positioning methods that combine a robust range-free estimate with a range-based one.

FIG. 1 illustrates a mobile node 110 in a wireless network transmitting a data packet 135. The wireless network includes a plurality of gateways 160, whose positions are known. A number N of these, whose locations are $(x_i, y_i)$; $(i=0, \ldots N-1)$, are in reception range and receive the signal 135. Each of the gateways 160 determines the time of arrival TOA of the packet 135, and the corresponding timestamps are collected (arrow 170) in a solver unit 180. The solver unit 180 is represented here as a separate functional entity, and may be physically implemented in a separate server, but it could also, without leaving the invention, be hosted in one of the gateways 160. It would be also conceivable, in the frame of the invention, that the position determination be performed in a plurality of solver units, independently or in collaboration.

Importantly, timestamps 170 taken by different gateways must be comparable with each other. To this purpose, the time references of the gateways 160 could be synchronized, by any suitable synchronization protocol (arrows 140), or the gateways 160 may rely on a common time reference in the form, for example, of GPS-disciplined clocks. In alternative, the time references of the gateways may be independent from each other, but the solver 180 knows their individual timing errors and can correct them, translating the timestamp 170 into a common time reference. It is not an essential feature of the invention that the signal 135 is a data packet, either; the invention could function with any signal whose time of arrival can be determined.

Figure 2:
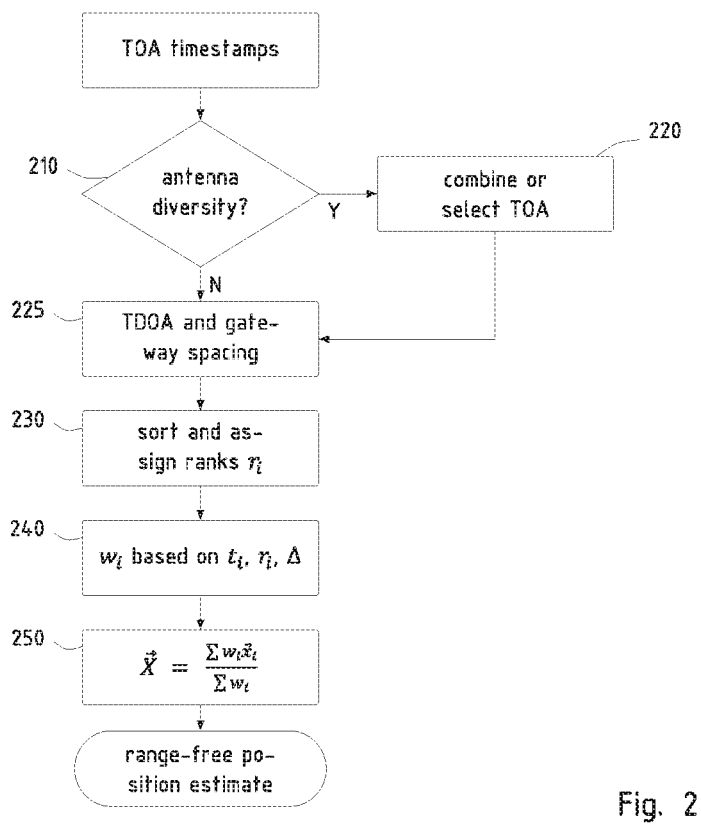
FIG. 2 represents, by a flowchart, a possible implementation of the inventive method.

In addition to the timestamp, the gateways could make other information accessible to the solver 180, for example an indicator of the received signal strength (RSSI), or the direction of the signal, if it is available. Should the gateway include a plurality of antennas, the metrics of all the antennas could be transmitted or, the gateway could transmit the metric relative to one selected antenna, chosen as the best representative of the diversity set, for example based on the RSSI or the first time of arrival. The gateway, or the solver, could compute "average" metrics, based on the signal received by all its antennas (see steps 210, 220 in FIG. 2).

The invention is not limited to the transmission and the reception of a single packet, either. If the transmission 135 is repeated, gateway 160 and/or the solver 180 have access also to the average time of arrival at a particular gateway, and to its variation.

The range-free location method of the invention proceeds in the solver as follows:

The TOA are sorted in decreasing order of arrival time, from the first to the last, and each is assigned a numeric rank $r_i$ (step 230). For example, the smallest TOA (the first signal to be received) is assigned the highest rank, and the highest the lowest rank. In the case represented, the first gateway to receive the signal could acquire rank 6, and the last one would receive rank 1.

The solver also computes the time differences of arrival or TDOA, that is the times of arrival of the signal relative to the first reception, $t_i$, and the average distance between all the gateways involved, $\Delta$ (step 225).

Assume there are a total of N nodes that have received a signal, the position of the mobile device will be determined by a WCL algorithm (step 250): a weighted (vector) sum of the position of the gateways using a set weight factors, which can be expressed as:

$$X = \frac{\sum_{i=0}^{N-1} w_i x_i}{\sum_{i=0}^{N-1} w_i}$$

$$Y = \frac{\sum_{i=0}^{N-1} w_i y_i}{\sum_{i=0}^{N-1} w_i}$$

(1)

where $w_i$ is the weighting factor for gateway $G_i$, X and Y are the estimated location of the target node.

An important feature of the inventive algorithm is the way to determine the weighting factors $w_i$ (step 240). According to the invention, the weights are determined based on the rank and on the value of the TDOA. Importantly, the values of the TDA may be corrected by a common scale factor that is derived from the average distance between the gateways that received the signal.

Specifically, the weights may be calculated by a weight function that is mainly determined by the rank value and, rank being constant, decreases for larger TDOA, such that gateways that are too far away from the target contribute little or nothing to the weighted summation. In a favourable implementation, the weight function is represented by $$w_i = r_i^2 \cdot \max(0, k - t_i/\Delta)$$

Figure 3:
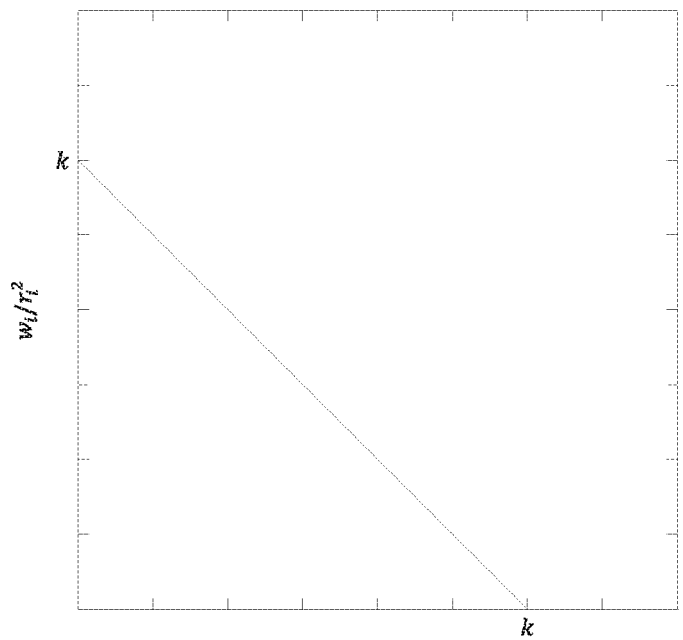
FIG. 3 plots a weight function.

(2)

where $r_i$ denotes the rank of the i-th gateway, and $t_i$ its TDOA, $\Delta$ is the average distance between all the gateways, and k is a constant factor that is predetermined and is not critical. Implementations with k=3, meaning that gateways whose TDOA is three times or more than the average gateway distance (multiplied by propagation speed, of course) contribute nothing to the position, have given good results in simulation. The plot in FIG. 3 shows how the weight factor decreases linearly for increasing $t_i$ in such a case. It is understood, however, that the linear dependence is not an essential feature, and other weight functions could be used as well. Preferably, the weights are never negative, which ensures that the position estimate will be contained in the polygon having the participating gateways at vertexes.

The method described above foresees the transmission of a single packet from the mobile node to the gateways. If more packets are exchanged, the precision can be increased by computing a new location for each packet, as described above, and finally combining the locations in a final estimate. The combination may be a simple average, or foresee different options, for example weighting each position in consideration of the number of receiving gateways, the signal received signal strength, etc.

The invention allows various improvements to enhance its precision and robustness. In a possible variant, the weighting factors on may be partly dependent form the RSSI, if they are available.

Advantageously, the range-free time position estimate calculated based on the TOA by formula can be combined with position estimates of different nature and origin. In one variant, the combination is made with range-free position estimation based on the RSSI's indication, possibly as described in European application No EP16196989 in the name of the applicant, which is hereby incorporated by reference and describes a position estimate in which the received gateways are sorted based on their RSSI, and combined with rank-dependent weights. In this manner a completely range-free position estimate is achieved.

The combination could foresee different options. The simplest is the averaging of the two estimates. A better accuracy could be obtained by applying weight to the two estimates that account for their different precision or reliability. The reliability of the RSSI-based estimate can be deduced by the absolute level of RSSI, and/or by the number of gateway involved. A figure of merit of the TOA-based estimation described above, can be judged by the average inter-gateway spacing $\Delta$, the number of gateways involved and, when several packets are received, TOA deviations.

In general, the TOA timestamps will allow also a range-based estimation of the position of the mobile note together with the range-free one. This estimation may be obtained by conventional lateration techniques, or possibly by the method described in European patent application EP16180854 in the name of the applicant, which is hereby incorporated by reference, and foresees the computation of an extended least median solution, out of a set of three-gateway solutions.

In an embodiment of the invention, the solver computes receives the times of arrival of the packet at the gateways and computes, out of them, both a range-based estimation $(x_r, y_r)$, and, as described above, a range-free estimation $(x_f, y_f)$, which are then combined into one. In this manner, the system of the invention can provide accurate positioning based on ranges when the propagation conditions are optimal or good and, with the onset of multipath, is still capable of positioning the nodes, possibly at the cost of some degradation of precision by using, and giving progressively more weight to, the range-free estimate.

As per the previous enhancement, the range-free and the range-based estimates could be simply averaged, or combined in a weighted average.

Preferably, the solver estimates the quality of the range-based estimate, and of the range-free one. These quality parameters are then use to determine their relative weights in the combination, or to select one rather than the other.

The quality of the range-based estimate can be judged in several ways. A valid possibility involves the least-square error residues of the TDOA, $$s^2 = \sum_{i=1}^{n-1} \left( \sqrt{(x-x_i)^2 + (y-y_i)^2} - \sqrt{(x-x_0)^2 + (y-y_0)^2} - t_i \right)^2 \quad (3)$$

where (x,y) denotes the range-based estimate, $(x_i, y_i)$ the position of the i-th gateway, $(x_o, y_o)$ that the first gateway that received the packet, and $t_i$ the i-th TDOA. The dilution of precision could also be used.

The quality of the range-free estimate can be judged, as mentioned above, from the average inter-gateway spacing Δ, or also the number of gateways involved and, when several packets are received, TOA deviations.

The quality parameters are compared with two threshold values. If the TDOA error residue $s^2$ exceeds the corresponding threshold, the range-based estimation is considered unreliable and is simply discarded; the position is estimated by the range-free method alone. Conversely, if the inter-gateway spacing Δ is higher than its corresponding threshold, the range-free estimation is discarded, and the position given by the range-based method only. If, however both estimation appear reliable, from this comparison with the thresholds, then the final estimation of the position will be a weighted average of the two. The relative weights are computed based on the relative quality parameters.

According to another variant, the position of the mobile node 110 is computed iteratively, with a step in which the time-of arrival timestamps $t_i$ are modified after the first position determination, and then a refined position is computed based on the adjusted timestamps. The adjustment of the timestamps, leads to a better positioning because it is done in order to compensate for multipath propagation. For each receiving gateway 160, the timestamp is corrected toward earlier time of arrival in such a manner that the time-shift introduced by multipath is at least in part eliminated.

Figure 4:
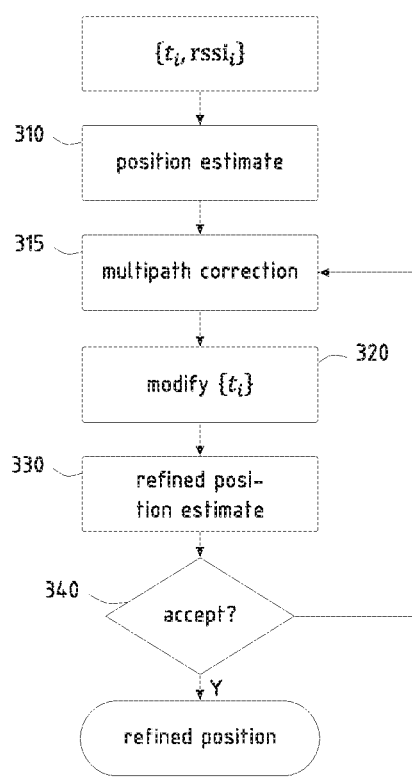
FIG. 4 describes an iterative method of position determination.

According to a possible variant, the positioning server 180 includes, or has access to a propagation model 185 (FIG. 1) that provides, from a first position estimate, the predicted values of from the first estimated position 310 (FIG. 4) to any gateway. The model can be setup once and reused as many times as necessary, and requires updates only at major terrain modifications like, in a city, substantial building modification or creation. From this multipath prediction, the timestamps $t_i$ can be modified (320) and a refined position 330, closer to the real position of the mobile node, estimated. The cycle of correcting the timestamps and refining the position can be repeated as many times as necessary, until the positioning the position is satisfactory, using a suitable convergence criterion 340.

In other variants, the multipath correction is not explicitly based on a prediction, but deduced from indicia of the multipath available to the positioning server. For example the server can compute, for each gateway, the path loss exponent L, based on the transmission equation:

$$P_{TX} + G_M + G_G - rssi = L \cdot 10 \log_{10} \frac{4\pi D}{\lambda} \quad (4)$$

where $P_{TX}$ denotes the transmitter's power, $G_M$ the antenna gain at the mobile node, $G_G$ the gain of the antenna at the gateway, rssi the received signal strength, D the distance, and λ the wavelength. The loss exponent equals 2 in free-space propagation. Its value will be lower than 2 for guided propagation and, quite often, will be higher than 2. L>2 is an indication of an obstruction, the higher the value of L, the larger the obstruction the signal has suffered. Since on average a large obstruction is correlated to higher delay and stronger multipath, high values of L indicate that multipath has taken place, and may prompt a compensation.

Preferably, the value of rssi in formula 4 is an aggregated value: a statistic indicator of several rssi determinations. It can be a mean, a median, a maximum value, or a quantile. Favourable results have been obtained taking $rssi_{agg}$ equal to the $80^{th}$ percentile of the received rssi values, i.e. a value close to the maximum received signal level.

The exact function used to compensate the $t_i$ may assume different forms, and may be chosen in consideration of the environment around a specific gateway, or mobile node. It has been found advantageous to compensate only those propagation times $t_i$ for which the corresponding loss exponent is larger a given exponent, for example compute a compensation only when L≥4, and zero compensation when L<4.

The iterative method above foresees at least two, possibly more, estimation of the position. These can be obtained with the rang-free estimate method of the prior embodiments but, in independent aspects of the invention, one all or some position estimates could be obtained otherwise, for example by lateration, based on the times of arrival, or any combination of times of arrival and signal strengths.

The invention claimed is:

1. A system comprising at least a mobile device and a plurality of gateways whose positions are known, wherein the gateways are operatively arranged receive a radio signal from the mobile device and to determine a time of arrival of said signal at the gateway, the system comprising a solver unit operatively arranged to compute the position of the mobile device based on said times of arrival, characterised in that the solver unit is arranged to assign to each gateway a weight factor dependent from its rank when the gateways are sorted by their received time of arrival, whereby those gateways whose time of arrival is earlier are assigned a heavier weight factor, the system being further arranged to compute the position of the mobile device by a weighted sum of the position of the gateways using said weight factors.

2. The system of claim 1, the solver being arranged to compute the weight factors based on the rank and the time-difference of arrival of the signal at the gateways.

3. The system of claim 2, the solver being arranged to divide the time-difference of arrival is by a scale factor dependent from the average distance between the gateways that received the signal.

4. The system of claim 1, wherein the weight factors are always positive or zero, and/or they are zero when the time-difference of arrival exceeds a determined value.

5. The system of claim 1, wherein the solver is arranged for computing the weight factors ($w_i$) of each gateway by:

$$= r^2_i \cdot \max(0, k - t_i/\Delta)$$

where $r_i$ represents the rank of the gateway, $t_i$ its time-difference of arrival, $\Delta$ the average distance between the gateways that received the signal, and k is a predetermined value.

6. The system of claim 1, operatively arranged to: compute also a range-based position estimation from said times of arrival; determine a first quality parameter expressing the quality of the range-free position estimate, a second quality parameter expressing the quality of said range-based position estimate; and combine the range-free position estimate and the range-based position estimate using said first and second quality parameters.

7. A method of determining the position of a mobile device relative to a plurality of gateways whose positions are known, comprising:
   determining for each gateway a time of arrival of the signal,
   assigning to each gateway a weight factor dependent from the rank it occupies when the gateways are sorted by their time of arrival, whereby those gateways whose time of arrival is earlier are assigned a heavier weight factor,
   computing the position of the mobile device by a weighted sum of the position of the gateways using said weight factors.

8. The method of claim 7, wherein the weight factors are computed based on the rank and the time-difference of arrival of the signal at the gateways.

9. The method of claim 8, wherein the time-difference of arrival is divided by a scale factor dependent from the average distance between the gateways that received the signal.

10. The method of claim 7, wherein the weight factors are always positive or zero, and/or they are zero when the time-difference of arrival exceeds a determined value.

11. The method of claim 7, wherein the weight factors ($W_i$) of each gateway are calculated by:

$$W_i = R_i^2 \cdot \max(0, k - t_i/\Delta)$$

where $r_i$ represents the rank of the gateway, $t_i$ its time-difference of arrival, $\Delta$ the average distance between the gateways that received the signal, and k is a predetermined value.

12. The method of claim 7, comprising: computing also a range-based position estimation from said times of arrival, determining a first quality parameter expressing the quality of the range-free position estimate, and a second quality parameter expressing the quality of said range-based position estimate, and combining the range-free position estimate and the range-based position estimate using said first and second quality parameters.

13. The method of claim 7, comprising a step of correcting the times of arrival towards earlier arrival times, based on an indication of multipath.

14. The method of claim 13, wherein the steps of correcting the times of arrival and of determining a refined position are repeated iteratively until a determined convergence criterion is satisfied.

15. The method of claim 13, wherein the indication of the multipath that the signal has suffered in the propagation to the corresponding gateway is a multipath prediction based on a propagation model.

16. The method of claim 13, wherein the indication of the multipath that the signal has suffered in the propagation to the corresponding gateway is derived from a path loss exponent.

* * * * *